United States Patent
Katou et al.

(10) Patent No.: US 6,931,923 B2
(45) Date of Patent: Aug. 23, 2005

(54) TIRE CONDITION MONITORING APPARATUS

(75) Inventors: Michiya Katou, Aichi-ken (JP); Takashi Ibuka, Gifu-ken (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 38 days.

(21) Appl. No.: 10/754,067

(22) Filed: Jan. 8, 2004

(65) Prior Publication Data

US 2004/0206168 A1 Oct. 21, 2004

(30) Foreign Application Priority Data

Apr. 18, 2003 (JP) ........................................ 2003-114743

(51) Int. Cl.[7] ...................... B60C 23/02; B60C 23/00
(52) U.S. Cl. ..................................... 73/146.5; 340/447
(58) Field of Search ............................... 73/146, 146.5; 340/446, 447; 701/29

(56) References Cited

U.S. PATENT DOCUMENTS

| | | | | |
|---|---|---|---|---|
| 4,609,905 A | * | 9/1986 | Uzzo ............................ | 340/447 |
| 4,852,419 A | * | 8/1989 | Kittel et al. ................. | 74/89.14 |
| 5,289,160 A | * | 2/1994 | Fiorletta ....................... | 340/447 |
| 5,541,574 A | * | 7/1996 | Lowe et al. .................. | 340/447 |
| 5,731,516 A | * | 3/1998 | Handfield et al. ........... | 73/146.5 |
| 5,808,190 A | * | 9/1998 | Ernst ........................... | 73/146.5 |
| 5,969,631 A | * | 10/1999 | Ammler et al. ............. | 340/825.21 |
| 6,340,929 B1 | * | 1/2002 | Katou et al. ................ | 340/447 |
| 6,430,484 B1 | * | 8/2002 | Takamura et al. ........... | 701/29 |
| 6,450,021 B1 | * | 9/2002 | Katou et al. ................ | 73/146.5 |
| 6,604,415 B2 | * | 8/2003 | Imao et al. .................. | 73/146.5 |
| 6,705,155 B2 | * | 3/2004 | Katou ......................... | 73/146 |
| 6,861,950 B2 | * | 3/2005 | Katou ......................... | 340/447 |

FOREIGN PATENT DOCUMENTS

| | | |
|---|---|---|
| EP | 1 013 483 A2 | 6/2000 |
| JP | 05-169931 | 7/1993 |
| WO | 01/12453 A1 | 2/2001 |

* cited by examiner

*Primary Examiner*—William Oen
*Assistant Examiner*—Andre Allen
(74) *Attorney, Agent, or Firm*—Vidas, Arrett & Steinkraus PA

(57) ABSTRACT

A tire monitoring apparatus includes transponders and a transmitter-receiver. Each transponder is provided in one of the tires of a vehicle, and the transmitter-receiver is mounted on the body frame of the vehicle. In response to a predetermined interrogating radio wave, each transponder detects a condition of the corresponding tire and wirelessly transmits data representing the detected condition of the tire. The transmitter-receiver transmits the interrogating radio wave and receives data wirelessly transmitted by each transponder. In a part of a period during which the corresponding tire rotates through one revolution, each transponder passes through a communication range. The transmitter-receiver changes the time interval at which the interrogating radio wave is transmitted such that the interrogating radio wave is transmitted while the transponder is in the communication zone. As a result, the conditions of the tires are always monitored in a reliable manner.

17 Claims, 3 Drawing Sheets

TIRE CONDITION MONITORING APPARATUS

BACKGROUND OF THE INVENTION

The present invention relates to a tire condition monitoring apparatus that permits a driver in a vehicle passenger compartment to check the conditions of tires, such as the air pressure, and to a tire condition monitoring apparatus. More particularly, the present invention relates to a tire condition monitoring apparatus having a transponder that wirelessly transmits data representing the condition of a tire in response to an interrogating radio wave, and a transmitter-receiver that transmits the interrogating radio wave and receives the data wirelessly transmitted by the transponder.

Conventionally, tires having a transponder are used. Such a transponder has a coil antenna for wirelessly transmitting the condition of a tire attached to a vehicle. When receiving an outside interrogating radio wave, an electric power is induced by the coil antenna. Based on the induced electric power, the transponder wirelessly transmits data representing, for example, the condition and identification of the tire (Japanese Laid-Open Patent Publication No. 5-169931).

In the art disclosed in the above-mentioned publication, however, the time intervals at which the interrogating radio wave is transmitted from the outside are constant regardless of the speed of the vehicle. Correspondingly, the transponder responding to the interrogating radio wave wirelessly transmits data including tire identification data always at constant time intervals. Therefore, even in a case where there is a need to immediately notify a driver of a tire abnormality, for example, during high-speed traveling, the notice is sent at the same time intervals as at the time of stoppage or low-speed traveling.

An antenna for transmitting the interrogating radio wave is provided in the vicinity of the corresponding transponder, e.g., in a wheel well. On the other hand, the tire in which the transponder is provided rotates as the vehicle travels. When the tire rotates, the transponder also rotates. Consequently, the distance between the antenna and the transponder is relatively changed. The wheel made of a metal exists between the antenna and the transponder particularly when the antenna and the transponder are in such positions that the distance therebetween is maximized. This means that there is a possibility of the transponder failing to normally receive the interrogating radio wave. In such a case, electric power necessary for enabling the transponder to operate is not generated in the coil antenna. As a result, the transponder cannot operate normally and transmit data representing the condition of the tire.

SUMMARY OF THE INVENTION

Accordingly, it is an objective of the present invention to provide a tire condition monitoring apparatus capable of unfailingly notifying an occupant of the condition of a tire regardless of the speed of the vehicle.

To achieve the foregoing and other objectives and in accordance with the purpose of the present invention, a tire condition monitoring apparatus that monitors a condition of a tire of a vehicle is provided. The apparatus includes a transponder and a transmitter-receiver. The transponder is provided in the tire. In response to a predetermined interrogating radio wave, the transponder detects a condition of the tire and wirelessly transmits data representing the detected condition of the tire. The transmitter-receiver is provided in a body frame of the vehicle. The position of the transponder relative to the transmitter-receiver changes as the tire rotates. The transmitter-receiver transmits the interrogating radio wave and is capable of receiving the data wirelessly transmitted by the transponder. In at least a part of a period during which the tire rotates through one revolution, the transponder passes through a communication range, in which communication between the transmitter-receiver and the transponder is possible. The transmitter-receiver has a controller that controls the transmission of the interrogating radio wave such that the interrogating radio wave is transmitted while the transponder is in the communication range.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A tire condition monitoring apparatus 1 according to one embodiment will now be described with reference to the drawings. The apparatus 1 is used in a vehicle such as an automobile.

Figure 1:
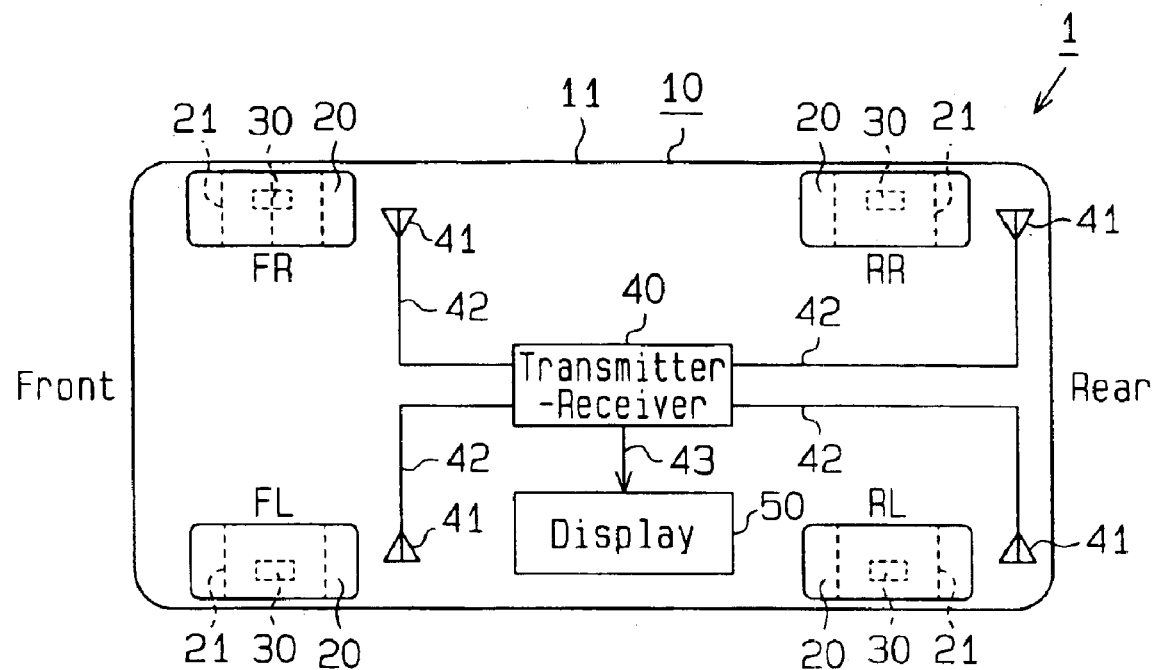
FIG. 1 is a diagrammatic view showing a tire condition monitoring apparatus according to one embodiment of the present invention.

As shown in FIG. 1, the tire condition monitoring apparatus 1 includes four transponders 30 and a transmitter-receiver 40. The each transponder 30 is located in one of the tires 20 of the vehicle 10. The transponders 30 are located in the tire 20 attached to a front left wheel 21 (front left wheel position (FL)), the tire 20 attached to a front right wheel 21 (front right wheel position (FR)), the tire 20 attached to a rear left wheel 21 (rear left wheel position (RL)), and the tire 20 attached to a rear right wheel 21 (rear right wheel position (RR)), respectively. The transmitter-receiver 40 is located on a body frame 11 of the vehicle 10.

Each transponder 30 is located in the corresponding tire 20 and is fixed, for example, to the corresponding wheel 21. Each transponder 30 measures the condition of the corresponding tire 20, that is, the pressure of the tire 20. The transponder 30 then wirelessly transmits data containing air pressure data.

The transmitter-receiver 40 is located at a predetermined position on the body frame 11 and is activated by electricity of a battery (not shown) of the vehicle 10. The transmitter-receiver 40 has four antennas 41, each of which corresponds to different one of the transponders 30. Each antenna 41 is connected to the transmitter-receiver 40 with a cable 42. The transmitter-receiver 40 transmits an interrogating radio wave from each antenna 41 at predetermined time intervals. Each transponder 30 induces electricity on the basis of the interrogating radio wave and wirelessly transmits data including air pressure data by the induced electricity. The transmitter-receiver 40 receives data transmitted by each transponder 30 chiefly through the corresponding antenna 41.

A display 50 is located in the view of the driver of the vehicle 10, for example, in the passenger compartment. The display 50 is connected to the transmitter-receiver 40 with a cable 43.

Figure 2:
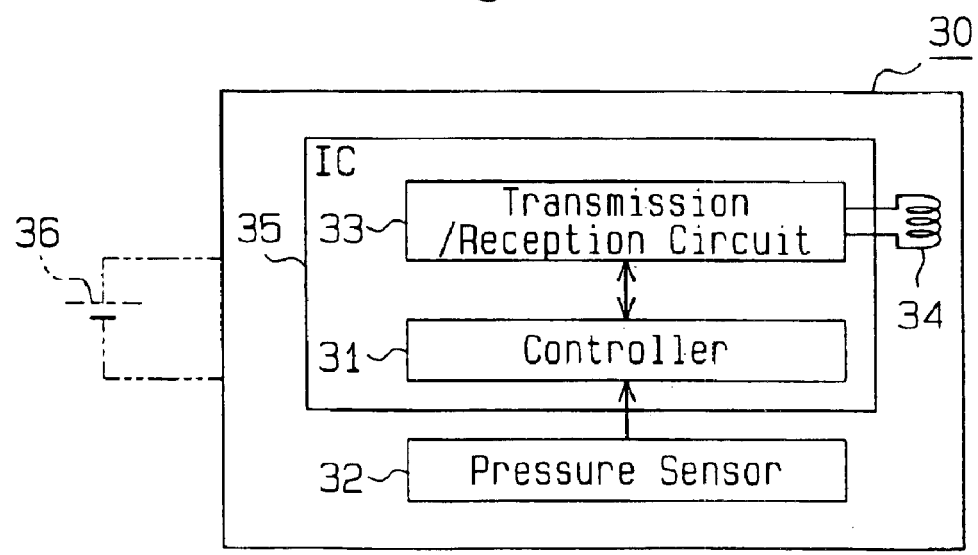
FIG. 2 is a block diagram showing a transponder of the tire condition monitoring apparatus of FIG. 1.

As shown in FIG. 2, each transponder 30 includes a controller 31, which is a microcomputer. The controller 31 includes, for example, a central processing unit (CPU), a read only memory (ROM), and a random access memory (RAM). A unique ID code is registered in an internal memory, for example, the ROM, of the controller 31. The ID code is used to distinguish the associated transponder 30 from the other three transponders 30. In this embodiment, each transponder 30 is arranged to wirelessly transmit data including air pressure data in response to the interrogating radio wave transmitted from the corresponding antenna 41. Therefore, an ID code is not necessarily required for identification of each of the positions at which the tires 20 are attached. However, ID codes are used for identification of the four transponders 30. Therefore, the positions of the tire 20 corresponding to the transponder 30 that has transmitted the signal can be identified on the basis of the ID codes.

The tire pressure sensor 32 measures the air pressure in the interior of the associated tire 20 and provides the controller 31 with pressure data, which is obtained from the measurement. Each controller 31 sends data containing the air pressure data and the registered ID code to a transmission/reception circuit 33. The transmission/reception circuit 33 encodes and modulates the data sent from the controller 31. The transmission/reception circuit 33 then wirelessly sends the data through the antenna 34.

The coil antenna 34 induces electricity in response to the interrogating radio wave. That is, in response to the interrogating radio wave transmitted by the corresponding antenna 41, the coil antenna 34 induces electricity. The transmission/reception circuit 33 supplies the induced electricity to the controller 31. The controller 31 controls the transponder 30 with the supplied electricity. In other words, the transponder 30 is activated with the electricity induced by the coil antenna 34. The controller 31 and the transmission/reception circuit 33 are integrated on a single IC 35.

Figure 3:
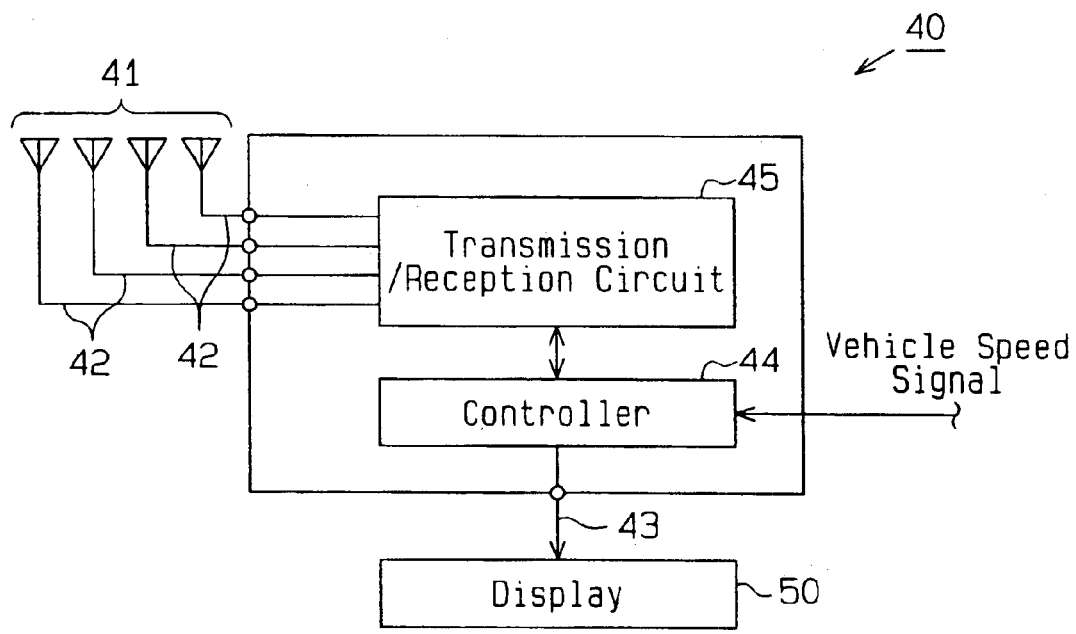
FIG. 3 is a block diagram showing a transmitter-receiver of the tire condition monitoring apparatus of FIG. 1.

As shown in FIG. 3, the transmitter-receiver 40 includes a controller 44 and a transmission/reception circuit 45. The transmission/reception circuit 45 processes data received with the antennas 41. The controller 44, which is, for example, a microcomputer, includes a CPU, a ROM, and a RAM. The transmission/reception circuit 45 receives data transmitted by each transponder 30 chiefly through the corresponding antenna 41. The transmission/reception circuit 45 demodulates and decodes the received data and sends the data to the controller 44.

Based on the received data, the controller 44 obtains the internal pressure of the tire 20 that is associated with the transponder 30 that is the source of the received data. The controller 44 also causes the display 50 to show data regarding the air pressure. Particularly, when there is an abnormality in the pressure of the tire 20, the controller 44 accordingly displays a warning on the display 50. The controller 44 receives a signal representing the speed of the vehicle 10, or a vehicle speed signal, from, for example, a speedometer (not shown) provided at a predetermined position in the vehicle 10. Therefore, the controller 44 grasps the speed of the vehicle 10.

The controller 44 causes the antennas 41 to transmit interrogating radio waves at a predetermined first time interval. The first time interval is determined on the basis of the speed of the vehicle 10, i.e., the vehicle speed signal input to the controller 44. For example, when the speed of the vehicle 10 is equal to or lower than 100 km/h, the first time interval is set to one minute, and one frame of the interrogating radio wave is transmitted at an interval of one minute. One frame of transmission of the interrogating radio wave includes multiple number of times of transmission, in which the interrogating radio wave is intermittently transmitted at a second time interval. The second time interval is shorter than the first time interval.

When the speed of the vehicle 10 is higher than 100 km/h and equal to or lower than 200 km/h, the transmission of the interrogating radio wave of one frame is carried out twice in one minute at the first time interval, which is for example thirty seconds. When the speed of the vehicle 10 is higher than 200 km/h and equal to or lower than 300 km/h, the transmission of the interrogating radio wave of one frame is carried out four times in one minute at the first time interval, which is for example fifteen seconds. That is, the controller 44 controls the number of frames of the interrogating radio wave transmitted in the unit time according to the speed of the vehicle 10.

Electricity is induced by the coil antenna 34 of the transponder 30 according to the interrogating radio wave. The transponder 30 makes the pressure sensor 32 measure the air pressure in the tire 20 by the induced electricity. The transponder 30 wirelessly transmits through the coil antenna 34 data including air pressure data obtained by the measurement. The transmitter-receiver 40 receives data transmitted by each transponder 30 chiefly through the corresponding antenna 41.

As described below, the second time interval is shortened as the speed of the vehicle 10 is increased.

[1] Case where the Speed of the Vehicle 10 is 20 km/h.

If the aspect ratio of the tire 20 attached to the wheel 21 on the vehicle 10 is 60% and the size of the wheel 21 is 15 inches, the diameter D of the tire 20 is 0.65 [m]. The number of revolutions R(20) per second of the tire 20 when the speed of the vehicle 10 is 20 km/h is as shown by the following equation:

$$R(20) = 20 \text{ [km/h]} \times 1000 \text{ [m]}/0.65 \text{ [m]} \times \pi \times 3600 \text{ [m]} \quad \text{(Equation 1)}$$

$$\approx 2.72 \text{ [revolutions/s]}$$

Accordingly, when the speed of the vehicle 10 is 20 km/h, the time T(20) during which the tire 20 rotates through one revolution is as shown by the following equation:

$$T(20) = 1/R(20) \quad \text{(Equation 2)}$$

$$= 1/2.72 \text{ [revolutions/s]}$$

$$\approx 0.370 \text{ [s/revolutions]}$$

$$= 370 \text{ [ms/revolutions]}$$

The time T during which the tire 20 rotates through one revolution can be regarded as the period of rotation of the tire 20.

Figure 4:
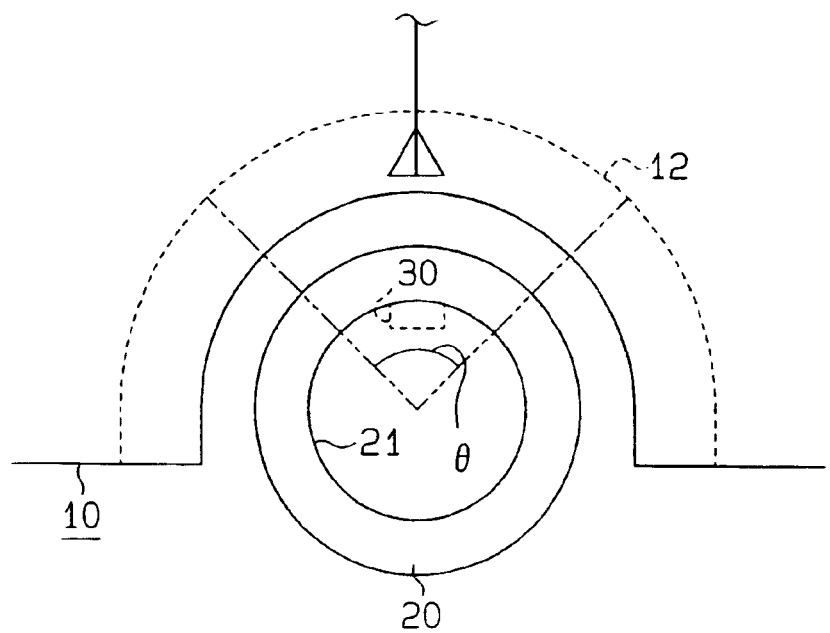
FIG. 4 is a diagram showing the positional relationship between an antenna placed in a wheel well and the transponder.

As shown in FIG. 4, the antenna 41 of the transmitter-receiver 40 is provided in each wheel well 12. An angle range θ (communication range) in which communication can be established with reliability between the antenna 41 of the transmitter-receiver 40 and the transponder 30 is a range of 90 degrees, or the sum of 45 degrees on the left side and 45 degrees on the right side of a line extending from the center of the tire 20 toward the antenna 41 of the transmitter-receiver 40. Therefore, the time Tp in which communication can be performed during one revolution of the tire 20 is ¼ of the time T during which the tire 20 rotates through one revolution. Each transponder 30 passes the angle range θ, which corresponds to the communication range, in the time Tp, which is a part of the time T during which the corresponding tire 20 rotates through one revolution.

Accordingly, when the speed of the vehicle 10 is 20 km/h, the time Tp(20) in which communication can be performed during one revolution of the tire 20 is as shown by the following equation:

$$Tp(20) = T(20)/4 \quad \text{(Equation 3)}$$
$$= 370 \text{ [ms/revolution]}/4$$
$$= 92.5 \text{ [ms/revolution]}$$

It has been experimentally confirmed that the time period from the time at which the transmitter-receiver 40 transmits the interrogating radio wave from the antenna 41 and the transponder 30 wirelessly transmits data including air pressure data in response to the interrogating radio wave to the time at which the transmitter-receiver 40 receives the wirelessly transmitted data, i.e., response time Tr, is about 3 [ms].

Therefore, when the speed of the vehicle 10 is 20 km/h the transmission interval Tk(20) condition is as shown by the following equation:

$$Tk(20) = Tp(20) - 3 \text{ [ms]} \quad \text{(Equation 4)}$$
$$= 92.5 \text{ [ms]} - 3 \text{ [ms]}$$
$$= 89.5 \text{ [ms]}$$

As a result, when the vehicle 10 is traveling at 20 km/h, the number of times Tn(20) of wireless transmission of the interrogating radio wave in the time T(20) during which the tire 20 rotates through one revolution, i.e. the time period before a lapse of time of 370 [ms], is as shown by the following equation:

$$Tn(20) = T(20)/Tk(20)$$
$$= 370 \text{ [ms]}/89.5 \text{ [ms]}$$
$$= 4.13 \text{ [times]}$$

Since the number of times Tn is an integer, the equation 5 is satisfied.

$$Tn(20)=5 \text{ [times]} \quad \text{(Equation 5)}$$

Consequently, when the vehicle 10 is traveling at 20 km/h, if the transmitter-receiver 40 transmits the interrogating radio wave five times within the time T(20) during which the tire 20 rotates through one revolution, that is, before a lapse of time of 370 [ms], the interrogating radio wave is transmitted at least once when the transponder 30 is positioned within the angle range θ in which communication can be performed.

Figure 5:
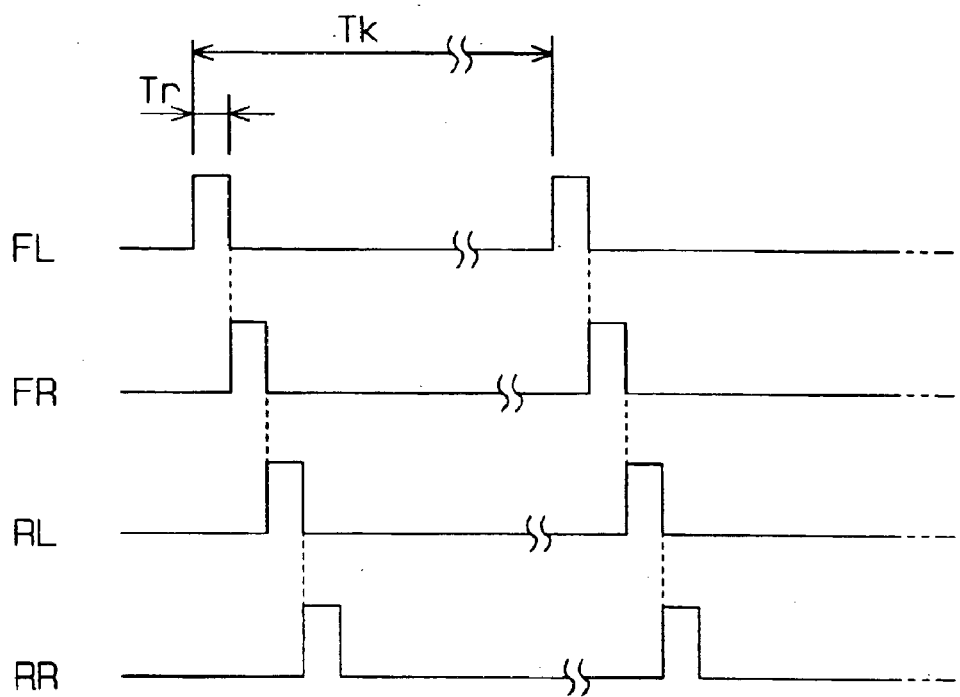
FIG. 5 is a timing chart showing transmission of an interrogating radio wave during traveling at a low speed and during traveling at a medium speed.

More specifically, as shown in FIG. 5, the transmitter-receiver 40 first transmits the interrogating radio wave to the transponder 30 provided in the tire 20 at the front left wheel position (FL). Subsequently, the transmitter-receiver 40 transmits the interrogating radio wave in sequence to the transponder 30 in the tire 20 at the front right wheel position (FR), to the transducer 30 in the tire 20 at the rear left wheel position (RL) and to the transducer 30 in the tire 20 at the rear right wheel position (RR). The transmitter-receiver 40 repeats this sequence of transmitting operations five times during one revolution of the tire 20, i.e., the time period before a lapse of time T(20) (=370 [ms/revolution]). As a result, the interrogating radio wave is transmitted at least one time when the transponder 30 is positioned within the angle range θ in which communication can be performed in the process of transmitting the interrogating radio wave five times. In response to the interrogating radio wave, the transponder 30 wirelessly transmits data including data on the measured air pressure. Therefore, the transmitter-receiver 40 can unfailingly receive the data including the air pressure data wirelessly transmitted from the transponder 30. In other words, the transmitter-receiver 40 can transmit the interrogating radio wave by considering the position of the transponder 30 following the rotation of the tire 20.

In this embodiment, the transmitter-receiver 40 has four antennas 41 respectively corresponding to the four transponders 30 and receives data wirelessly transmitted from each transponder 30 chiefly through the corresponding antenna 41. Therefore, an arrangement is theoretically possible in which the interrogating radio waves are simultaneously transmitted from the four antennas 41 and data wirelessly transmitted from the corresponding transponders 30 is received.

However, if the interrogating radio waves are simultaneously transmitted from the four antennas 41, the transponders 30 simultaneously transmit data wirelessly. In such a case, the groups of data respectively transmitted wirelessly from the transponders 30 interfere with each other and there is a possibility of crosstalk between the groups of data. The timing at which the transmitter-receiver 40 transmits the interrogating radio wave to each transponder 30 is different from the transmission timing of the interrogating radio wave to the other transponders 30 such that communication between each antenna 41 and the corresponding transponder 30 does not coincide with communication between any of the other antennas 41 and the corresponding transponder 30.

[2] Case where the Vehicle 10 Travels at a Low Speed and a Medium Speed (e.g., a Speed Higher than 20 km/h and Equal to or Lower than 100 km/h)

In this case, as in the case where the speed of the vehicle 10 is 20 km/h, the number of times Tn the interrogating radio wave is transmitted during which the tire 20 rotates through one revolution is set with reference to the speed of the vehicle 10. More specifically, the number of times Tn may be set on the basis of equations 1 to 5 shown above. Alternatively, different numbers of times Tn selected according to the speed of the vehicle 10 may be stored in advance. In a case where different numbers are stored as the number of times Tn, number of times Tn corresponding to speeds set in steps of 10 km/h with reference to the speed of the vehicle 10 may be stored or the speeds of the vehicle 10 set in correspondence with to the number of times Tn with reference to the number of times Tn may be stored. If the number of times Tn is set with reference to the speed of the vehicle 10, the second time interval is shortened as the speed of the vehicle 10 is increased.

[3] Case where the Vehicle 10 Travels at a High Speed (e.g., a Speed Higher Than 100 km/h and Equal to or Lower than 300 km/h)

In this case, as in the case described above, the number of times Tn the interrogating radio wave is transmitted in a period during which the tire 20 rotates through one revolution is set with reference to the speed of the vehicle 10. In this case, since the speed of the vehicle 10 is high, the time T during which the tire 20 rotates through one revolution, i.e., the period of rotation of the tire 20, is short. That is, when the speed of the vehicle 10 is, for example, 101 km/h, the number of revolutions R(101) through which the tire 20 rotates in one second is 13.74 [revolutions/s] ($\approx$101 [km/h]$\times$1000 [m]/0.65 [m]$\times\pi\times$3600 [s]). When the speed of the vehicle 10 is 101 km/h, the time T(101) during which the tire 20 rotates through one revolution is 72.8 (ms/revolution) ($\approx$1/13.74 [revolutions/s]). The time Tp(101) during which communication can be performed when the tire 20 of the vehicle 10 traveling at 101 km/h is 18.2 [ms/revolution](= 72.8 [ms/revolution]/4). The transmission interval Tk(101) condition when the speed of the vehicle 10 is 101 km/h is 15.2 [ms](=18.2 [ms]–3 [ms]). Consequently, it is necessary that the transmitter-receiver 40 transmit the interrogating radio wave to each transponder 30 at least once in a time period of 15.2 [ms].

It is virtually possible to transmit the interrogating radio wave at such short transmission time intervals Tk, but it is not practical to do so. That is, since the response time Tr is about 3 [ms], the total response time $\Sigma$Tr in the vehicle 10 on which four tires 20 are mounted is 12 [ms](=3 [ms]'4). Therefore, the transmission interval Tk(101) (=15.2 [ms]) when the speed of the vehicle 10 is 101 km/h is approximate to the total response time $\Sigma$Tr (=12 [ms]). When the speed of the vehicle 10 is about 153 km/h, the transmission interval Tk(153)$\approx$12 [ms], which is approximately equal to the total response time $\Sigma$Tr (=12 [ms]).

Figure 6:
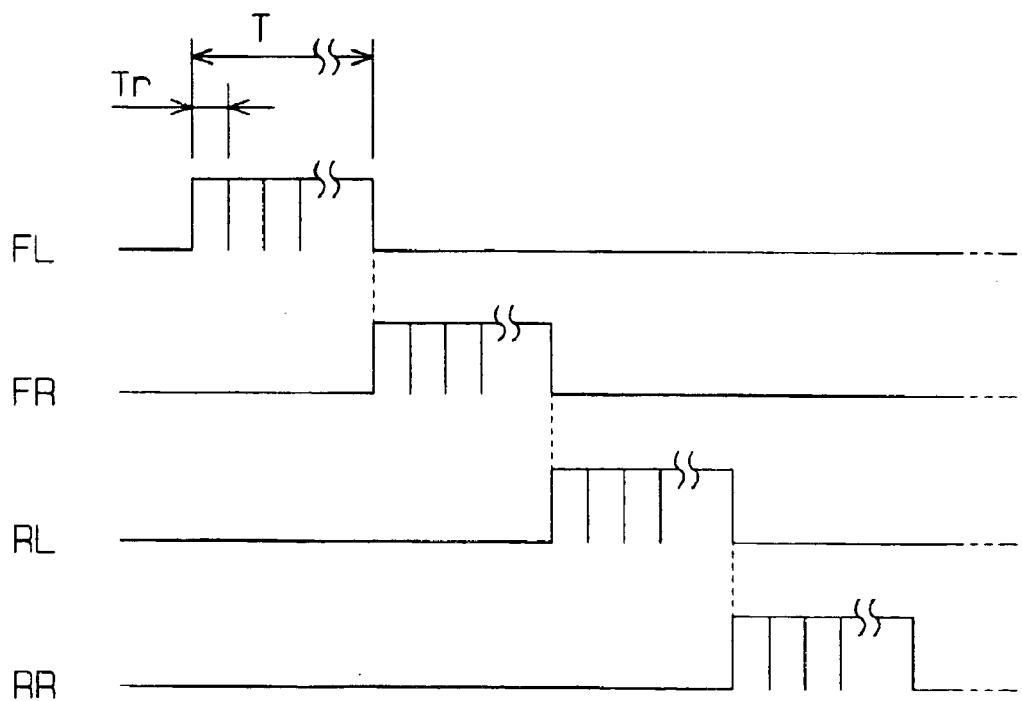
FIG. 6 is a timing chart showing transmission of the interrogating radio wave during traveling at a high speed.

Therefore, if the transmission interval Tk is short, there is a possibility of cross-talk with groups of data successively transmitted wirelessly from the transponders 30 provided in the other tires 20. During high-speed traveling of the vehicle 10, therefore, the interrogating radio wave is transmitted to only one transponder 30 at the set second time interval till the end of the time period T during which the tire 20 rotates through one revolution as shown in FIG. 6. In other words, interrogating radio wave is continuously transmitted to only one transponder 30 until one revolution of the tire 20 is completed. Thus, when as shown in FIG. 4 the corresponding transponder 30 is positioned in the angle range θ in which communication can be performed, the transponder 30 continues wirelessly transmitting data including air pressure data on the basis of the interrogating radio wave from the transmitter-receiver 40 without interfering with data from the other transponders 30. Therefore, the transmitter-receiver 40 can unfailingly receive the data including the air pressure data wirelessly transmitted from the transponder 30.

In this embodiment, no particular consideration is given to a case where the speed of the vehicle 10 is lower than 20 km/h. Therefore, there is a possibility of the interrogating radio wave being transmitted from the antenna 41 of the transmitter-receiver 40, for example, only at a point in time at which the wheel 21 made of a metal exists between the antenna 41 of the transmitter-receiver 40 and the corresponding transponder 30. In such a case, the transponder 30 cannot normally receive the interrogating radio wave and, therefore, electricity necessary for operating the transponder 30 is not generated in the coil antenna 34. As a result, the transponder 30 does not operate normally and cannot wirelessly transmit data representing the condition of the tire 20. When the vehicle speed is in this speed region, however, there is no particularly serious problem with failure to display data on the air pressure on the display 50. That is, even if an event which may lead to an abrupt change in the air pressure in the tire 20, e.g., a puncture of the tire 20 occurs when the vehicle speed is in this speed region, the vehicle 10 can be safely stopped. Also, no particular consideration is given to a case of backward traveling of the vehicle 10 for the same reason. Needless to say, transmission of the interrogating radio wave may be performed the number of times Tn, which is set according to the speed of the vehicle 10, in the case of traveling of the vehicle 10 at a speed lower than 20 km/h or backward traveling of the vehicle 10.

An operation of the tire condition monitoring apparatus 1 thus arranged will now be described.

First, the controller 44 of the transmitter-receiver 40 determines, on the basis of the input vehicle speed signal, the number of times the interrogating radio wave of one frame to be transmitted in the unit time (e.g., one minute). The time interval of transmission of the interrogating radio wave of one frame, or the first time interval, is thereby determined. The controller 44 of the transmitter-receiver 40 also determines the time interval (the second time interval) of multiple number of times of transmission of the interrogating radio wave constituting one frame on the basis of the input vehicle speed signal.

The controller 44 of the transmitter-receiver 40 makes the transmission/reception circuit 45 transmit the interrogating radio wave through each antenna 41 on the basis of the determined first time interval time interval and the second time interval. Electricity is then induced in the coil antenna 34 of the transponder 30 corresponding to the antenna 41. The induced electricity permits the transponder 30 to measure the air pressure in the tire 20 with the pressure sensor 32. The transponder 30 wirelessly transmits data containing the data of the measured air pressure with the coil antenna 34.

The transmitter-receiver 40 receives data wirelessly transmitted by the transponder 30 through the corresponding reception antenna 41. Based on the received data, the transmitter-receiver 40 obtains the air pressure of the tire 20 that is associated with the transponder 30 that is the source of the received data. The transmitter-receiver 40 also causes the display 50 to show data regarding the air pressure. Particularly, when there is an abnormality in the pressure of the tire 20, the controller 44 accordingly displays a warning on the display 50.

This embodiment has the following advantages.

(1) The angle range θ in which communication can be performed with reliability between the antenna 41 of the transmitter-receiver 40 and the transponder 30 is a range of 90 degrees, or the sum of 45 degrees on the left side and 45 degrees on the right side of a line extending from the center of the tire 20 toward the antenna 41 of the transmitter-receiver 40. Also, the transmitter-receiver 40 transmits the interrogating radio wave at least one time when the transponder 30 is positioned within the angle range θ according to the speed of the vehicle 10. The transponder 30 operating in response to the interrogating radio wave is thereby enabled to wirelessly transmit data including data on the measured air pressure. Therefore the transmitter-receiver 40 can unfailingly receive the data including the air pressure data wirelessly transmitted from the transponder 30. In other words, the transmitter-receiver 40 transmits the interrogating radio wave by considering the position of the transponder 30 following the rotation of the tire 20. Thus, the tire condition monitoring apparatus 1 can unfailingly notify the condition of the tire 20 no matter what the speed of the vehicle 10.

(2) The transmitter-receiver 40 determines according to the speed of the vehicle 10 the time period in which the transponder 30 is positioned within the angle range θ in which communication can be performed. The transmitter-receiver 40 transmits the interrogating radio wave at least one time in the time period during which the transponder 30 is positioned within the angle range θ. The transponder 30 operating in response to the interrogating radio wave is thereby enabled to wirelessly transmit data including data on the measured air pressure. Therefore, the transmitter-receiver 40 can unfailingly receive the data including the air pressure data wirelessly transmitted from the transponder 30.

(3) The transmitter-receiver 40 transmits the interrogating radio wave in sequence to the transponders 30 provided in the tire 20 at the front left wheel position (FL), the tire 20 at the front right wheel position (FR), the tire 20 at the rear left wheel position (RL) and the tire 20 at the rear right wheel position (RR), and receives data including air pressure data wirelessly transmitted from each of the transponders 30 in response to the interrogating radio wave. That is, the transmitter-receiver 40 transmits the interrogating radio wave in sequence to the transponders 30 provided in all the tires 20 and receives data including air pressure data wirelessly transmitted from each transponder 30 in response to the interrogating radio wave. That is, the interrogating radio wave is transmitted at times differently set with respect to the tires 20. Interference and cross-talk between groups of data including air pressure data wirelessly transmitted from the transponders 30 can therefore be prevented. Consequently, the transmitter-receiver 40 can unfailingly receive the data including the air pressure data wirelessly transmitted from each transponder 30.

(4) When the vehicle 10 travels at a high speed, the interrogating radio wave is continuously transmitted to only one of the transponders 30 till the end of the time period T during which the tire 20 rotates through one revolution. In other words, interrogating radio wave is continuously transmitted to only one transponder 30 until one revolution of the tire 20 is completed. As a result, each transponder 30 transmits data without interfering with data from the other transponders 30. Therefore, the transmitter-receiver 40 can unfailingly receive the data including the air pressure data wirelessly transmitted from the transponder 30.

(5) The transmitter-receiver 40 increases the number of times the interrogating radio wave is transmitted in the unit time period as the speed of the vehicle 10 is increased. Therefore, when an abnormality occurs in the tires 20 during high-speed traveling of the vehicle 10, an alarm display indicating the abnormality is immediately produced on the display 50. In this manner, the driver can be immediately informed of an abnormality in the tires 20 during high-speed traveling of the vehicle 10. Thus, an abnormality in the tires 20 can be immediately notified according to the speed of the vehicle 10.

(6) When the vehicle 10 is stopped (e.g., in a parking space of a large store) or traveling at a low speed (e.g., in a traffic jam), the possibility of being close to some other vehicle 10 is high. On the other hand, when the vehicle 10 is traveling at a high speed, the possibility of being close to some other vehicle 10 is low in comparison with the case of stoppage or traveling at a low speed. Therefore, even if the number of times the interrogating radio wave is transmitted in the unit time period is increased when the vehicle 10 is traveling at a high speed, the possibility of the transmitter-receiver 40 receiving data from some other vehicle 10 having transponders 30 is low. There is no problem with increasing the number of times the interrogating radio wave is transmitted in the unit time period when the vehicle 10 is traveling at a high speed.

(7) The controller 44 controls the number of times the interrogating radio wave is transmitted in the unit time period according to the speed of the vehicle 10. Accordingly, the transmission/reception circuit 45 transmits the interrogating radio wave the optimum number of times per unit time with respect to the speed of the vehicle 10. Therefore, there is no possibility of the interrogating radio wave being unnecessarily transmitted during stoppage or high-speed traveling of the vehicle 10.

(8) The transmitter-receiver 40 changes the number of times the interrogating radio wave is transmitted according to the speed of the vehicle 10. That is, one frame of the interrogating radio wave is transmitted every minute when the speed of the vehicle 10 is equal to or lower than 100 km/h; two frames of the interrogating radio wave are transmitted every minute (e.g., one frame every 30 seconds) when the speed of the vehicle 10 is higher than 100 km/h and equal to or lower than 200 km/h; and four frames of the interrogating radio wave are transmitted every minute (e.g., one frame every 15 seconds) when the speed of the vehicle 10 is higher than 200 km/h and equal to or lower than 300 km/h. That is, speeds that the vehicle 10 may have are discretely set in a plurality of speed regions in the transmitter-receiver 40 and the number of times the interrogating radio wave is transmitted in the unit time period is increased when one of the speed regions higher than a predetermined one is reached by the speed of the vehicle 10.

Therefore, when an abnormality occurs in the tires 20 during high-speed traveling of the vehicle 10, an alarm display indicating the abnormality is immediately produced on the display 50. Thus, an abnormality in the tires 20 can be immediately notified according to the speed of the vehicle 10.

It should be apparent to those skilled in the art that the present invention may be embodied in many other specific forms without departing from the spirit or scope of the invention. Particularly, it should be understood that the invention may be embodied in the following forms.

While a case in which the tire 20 having an aspect ratio of 60% is attached to the wheel 21 having a size of 15 inches on an ordinary vehicle 10 has been assumed with respect to the above-described embodiment, there are various kinds of vehicle 10 (e.g., multi-wheeled vehicles typified by four-wheel vehicles, buses and trucks). Also, there are tires 20 of various sizes. Therefore, it is preferred that the first time interval and the second time interval be changeably set according to the kind of the vehicle 10 or the size of the tire 20. More specifically, a program for controlling the controller 44 of the transmitter-receiver 40 is changed to enable these time intervals, i.e., timing of transmission of the interrogating radio wave, to be changeably set.

The angle range θ in which communication can be performed as shown in FIG. 4 varies largely depending on factors such as the sensitivity of the antenna 41 of the ordinary transmitter-receiver 40, the performance of the transmission/reception circuit 45 of the transmitter-receiver 40 and the transmission output of the transponder 30.

Therefore, the settings in the apparatus may be changeably made by considering the possibility of changes in the angle θ in which communication can be performed, in other words, by considering the above-mentioned factors, etc.

A setting as to which number of interrogating radio wave frames should be transmitted in the unit time period (e.g., one minute) may be made in advance according to the speed of the vehicle 10 or may be computed according to the speed of the vehicle 10 on the basis of a predetermined computation formula (e.g., an integer obtained by the speed of the vehicle 10×2/100).

Also, it is preferred that the setting as to which number of interrogating radio wave frames should be transmitted be changeable according to an environment in which the vehicle 10 is used, an area where the vehicle 10 is used, or the like.

A battery 36 for supplying electric power to the transponder 30 may be provided, as indicated by the double-dot-dash line in FIG. 2. The controller 31 supplies power from the battery 36 when the electricity induced by the coil antenna 34 according to the interrogating radio wave from the transmitter-receiver 40 is smaller than the power necessary for operating the transponder 30. Also, the controller 31 supplies power from the battery 36 when the air pressure in the tire 20 changes abruptly regardless of the existence/nonexistence of the interrogating radio wave. This arrangement ensures that the transponder 30 can wirelessly transmit data including air pressure data even when the induced electricity is insufficient or when the air pressure in the tire 20 changes abruptly. The transmitter-receiver 40 can therefore produce on the display 50 an alarm display indicating an abnormality of the air pressure in the tire 20.

Further, the controller 31 may supply power from the battery 36 when there is a need to increase the transmission output from the transponder 30.

A temperature sensor for measuring the temperature in the tire 20 may be provided in the transponder 30 in addition to the pressure sensor 32 to enable data on the temperature in the tire 20 to be wirelessly transmitted.

Air pressure data transmitted from the transponder 30 may be data indicating a concrete air pressure value, or data simply indicating whether or not the air pressure is within an allowable range, in other words, data indicating whether or not the tire 20 is in an abnormal condition.

Gas filling the tires 20 need not be air, which contains 78% of nitrogen. For example, nitrogen gas (100% of nitrogen) may be used.

Other than four-wheeled vehicles, the present invention may be applied to two-wheeled vehicles, such as bicycles and motorcycles, multi-wheeled buses, multi-wheeled trailers and industrial vehicles, such as forklifts, that uses the tires 20. When the present invention is applied to a towed vehicle, the transmitter-receiver 40 and the display 50 are provided in the tractor.

Therefore, the present examples and embodiments are to be considered as illustrative and not restrictive and the invention is not to be limited to the details given herein, but may be modified within the scope and equivalence of the appended claims.

What is claimed is:

1. A tire condition monitoring apparatus that monitors a condition of a tire of a vehicle, the apparatus comprising:
 a transponder provided in the tire, wherein, in response to a predetermined interrogating radio wave, the transponder detects a condition of the tire and wirelessly transmits data representing the detected condition of the tire; and
 a transmitter-receiver provided in a body frame of the vehicle, wherein the position of the transponder relative to the transmitter-receiver changes as the tire rotates, wherein the transmitter-receiver transmits the interrogating radio wave and is capable of receiving the data wirelessly transmitted by the transponder, wherein, in at least a part of a period during which the tire rotates through one revolution, the transponder passes through a communication range, in which communication between the transmitter-receiver and the transponder is possible, and wherein the transmitter-receiver has a controller that controls the transmission of the interrogating radio wave such that the interrogating radio wave is transmitted while the transponder is in the communication range.

2. The apparatus according to claim 1, wherein the controller controls the transmission of the interrogating radio wave according to the speed of the vehicle.

3. The apparatus according to claim 2, wherein the controller causes the transmitter-receiver to intermittently transmit the interrogating radio wave, and controls a time interval of transmission of the interrogating radio wave according to the speed of the vehicle.

4. The apparatus according to claim 3, wherein the controller shortens the time interval of transmission of the interrogating radio wave as the speed of the vehicle increases.

5. The apparatus according to claim 4, wherein the controller sets a number of times of transmission of the interrogating radio wave in the period during which the tire rotates through one revolution such that the interrogating radio wave is transmitted at least once while the transponder is in the communication range.

6. The apparatus according to claim 1, wherein the controller causes the transmitter-receiver to perform transmission of the interrogating radio wave at a first time interval, wherein the transmission performed at the first time interval includes a plurality of number of times of transmission of the interrogating radio wave, in which the interrogating radio wave is intermittently transmitted at a second time interval that is shorter than the first time interval, and wherein the controller shortens the second time interval as the speed of the vehicle increases.

7. The apparatus according to claim 6, wherein the controller shortens the first time interval as the speed of the vehicle increases.

8. The apparatus according to claim 1, wherein the transmitter-receiver includes an antenna provided at a part of the body frame that faces the tire, wherein the interrogating radio wave is transmitted through the antenna, and wherein the data from the transponder is received through the antenna.

9. The apparatus according to claim 8, wherein the tire is one of a plurality of tires, wherein the transponder is one of a plurality of transponders each provided in one of the tires, and wherein the antenna is one of a plurality of antennas each corresponding to one of the transponders.

10. The apparatus according to claim 9, wherein the controller controls transmission of the interrogating radio wave from the transmitter-receiver such that communication between each antenna and the corresponding transponder does not coincide with communication between any of the other antennas and the corresponding transponder.

11. A tire condition monitoring apparatus that monitors conditions of tires of a vehicle, the apparatus comprising:
 a plurality of transponders each provided in one of the tires, wherein, in response to a predetermined interrogating radio wave, each transponder detects a condition of the corresponding tire and wirelessly transmits data representing the detected condition of the tire;

a plurality of antennas each provided at a part of a body frame of the vehicle that faces the one of the tires, wherein the position of each transponder relative to the corresponding antennal changes as the tire rotates; and a transmitter-receiver provided in the body frame, wherein the transmitter-receiver transmits the interrogating radio wave through each antenna, and is capable of receiving the data wirelessly transmitted by each transponder through the corresponding antenna, wherein, in at least a part of a period during which the corresponding tire rotates through one revolution, each transponder passes through a communication range, in which communication between the transponder and the corresponding antenna is possible, and wherein the transmitter-receiver has a controller that controls the transmission of the interrogating radio wave such that the interrogating radio wave is transmitted while each transponder is in the communication range.

12. The apparatus according to claim 11, wherein the controller causes the transmitter-receiver to intermittently transmit the interrogating radio wave, and controls a time interval of the transmission of the interrogating radio wave according to the speed of the vehicle.

13. The apparatus according to claim 12, wherein the controller shortens the time interval of transmission of the interrogating radio wave as the speed of the vehicle increases.

14. The apparatus according to claim 13, wherein the controller sets a number of times of transmission of the interrogating radio wave in the period during which the each tire rotates through one revolution such that the interrogating radio wave is transmitted at least once while each transponder is in the communication range.

15. The apparatus according to claim 11, wherein the controller causes the transmitter-receiver to perform transmission of the interrogating radio wave at a first time interval, wherein the transmission performed at the first time interval includes a plurality of number of times of transmission of the interrogating radio wave, in which the interrogating radio wave is intermittently transmitted at a second time interval that is shorter than the first time interval, and wherein the controller shortens the second time interval as the speed of the vehicle increases.

16. The apparatus according to claim 15, wherein the controller shortens the first time interval as the speed of the vehicle increases.

17. The apparatus according to claim 11, wherein the controller controls transmission of the interrogating radio wave from the transmitter-receiver such that communication between each antenna and the corresponding transponder does not coincide with communication between any of the other antennas and the corresponding transponder.

* * * * *